US007419182B2

(12) United States Patent
Goertzen et al.

(10) Patent No.: US 7,419,182 B2
(45) Date of Patent: Sep. 2, 2008

(54) MOBILITY AID

(75) Inventors: Gerold Goertzen, Brunswick, OH (US); William A. Null, Jr., Sullivan, OH (US); Bradley Kushner, Elyria, OH (US)

(73) Assignee: Invacare Corporation, Elyria, OH (US)

( * ) Notice: Subject to any disclaimer, the term of this patent is extended or adjusted under 35 U.S.C. 154(b) by 241 days.

(21) Appl. No.: 11/334,295

(22) Filed: Jan. 18, 2006

(65) Prior Publication Data

US 2006/0157953 A1 Jul. 20, 2006

Related U.S. Application Data

(60) Provisional application No. 60/593,494, filed on Jan. 19, 2005.

(51) Int. Cl.
*B62B 7/00* (2006.01)

(52) U.S. Cl. ........................ 280/647; 280/642; 280/650

(58) Field of Classification Search .............. 280/763.1, 280/764.1, 642, 647, 650, 47.38, 304.1
See application file for complete search history.

(56) References Cited

U.S. PATENT DOCUMENTS

| | | | | |
|---|---|---|---|---|
| 5,435,404 | A | 7/1995 | Garin, III | |
| 5,957,474 | A * | 9/1999 | Mundy et al. | 280/304.1 |
| 5,964,473 | A | 10/1999 | Degonda et al. | |
| 6,454,286 | B1 * | 9/2002 | Hosino | 280/250.1 |
| 6,530,598 | B1 * | 3/2003 | Kirby | 280/755 |
| 2001/0008335 | A1 * | 7/2001 | Roche | 280/278 |

* cited by examiner

*Primary Examiner*—Christopher Ellis
*Assistant Examiner*—Katy Meyer
(74) *Attorney, Agent, or Firm*—Calfee Halter & Griswold LLP

(57) ABSTRACT

A wheelchair includes at least one side frame connected to a front caster assembly, and a cross-brace assembly. The cross-brace assembly includes a cross-brace member; at least one rear caster assembly connected to the cross-brace member; at least one main drive wheel axle tube fitting connected to the cross-brace member; and at least one arm connected to the cross-brace member. The at least one arm is pivotally connected to the at least one side frame through a pivot joint.

18 Claims, 10 Drawing Sheets

MOBILITY AID

RELATED APPLICATIONS

This application claims the benefit of U.S. Application No. 60/593,494, filed Jan. 19, 2005, titled Mobility Aid, the entire disclosure of which is incorporated by reference.

BACKGROUND OF THE INVENTION

Wheelchairs and scooters are an important means of transportation for a significant portion of society. Whether manual or powered, these vehicles provide an important degree of independence for those they assist. However, this degree of independence can be limited if the wheelchair is required to traverse obstacles such as, for example, curbs that are commonly present at sidewalks, driveways, and other paved surface interfaces. This degree of independence can also be limited if the vehicle is required to ascend inclines or descend declines.

BRIEF SUMMARY OF THE INVENTION

In one aspect the invention relates to a wheelchair including at least one side frame connected to a front caster assembly, and a cross-brace assembly. The cross-brace assembly includes a cross-brace member; at least one rear caster assembly connected to the cross-brace member; at least one main drive wheel axle tube fitting connected to the cross-brace member; and at least one arm connected to the cross-brace member. The at least one arm is pivotally connected to the at least one side frame through a pivot joint.

In another aspect the invention relates to a wheelchair including a left side frame connected to a left front caster assembly, and a right side frame connected to a right front caster assembly, the left side frame and the right side frame together supporting a seat of the wheelchair. A cross-brace assembly extends across the wheelchair, and includes a cross-brace member having left and right main wheel fittings for supporting left and right main wheels of the wheelchair. A left arm is connected to the cross-brace member, the left arm being pivotally connected to the left side frame through a left pivot joint. A right arm is connected to the cross-brace member, the right arm being pivotally connected to the right side frame through a right pivot joint. A rear caster arm extends from the cross-brace member and supports a rear caster assembly.

DESCRIPTION OF PREFERRED EMBODIMENTS

The following includes definitions of exemplary terms used throughout the disclosure. Both singular and plural forms of all terms fall within each meaning:

"Attachment" as used herein includes, but is not limited to, something that directly or indirectly attaches one thing to another including, for example, a tie, band, fastener, clamp, or pin.

"Substantially horizontal" as used herein includes, but is not limited to, being largely but not wholly: in the plane of a horizon or primary axis; of, relating to, or near the horizon; or parallel to or in the plane of the horizon; at right angles to a vertical line. "Substantially horizontal" as used herein also includes, but is not limited to, being wholly: of, relating to, or near the horizon; parallel to or in the plane of the horizon; or at right angles to a vertical line. "Substantially horizontal" further includes, but is not limited to, angular deviations up to and including 45 degrees from a horizontal line or axis.

"Substantially vertical" as used herein includes, but is not limited to, being largely but not wholly: perpendicular to the plane of the horizon or to a primary axis; upright; or located at right angles to the plane of a supporting surface. "Substantially vertical" as used herein also include, for example, being wholly: perpendicular to the plane of the horizon or to a primary axis; upright; or located at right angles to the plane of a supporting surface. "Substantially vertical" further includes, but is not limited to, angular deviations up to and including 45 degrees from a vertical line or axis.

"Attach" or "connect" as used herein includes, but is not limited to, directly or indirectly fastening, securing, joining, coupling, affixing, appending, adding, or binding two or more things or components together.

Figure 1A:
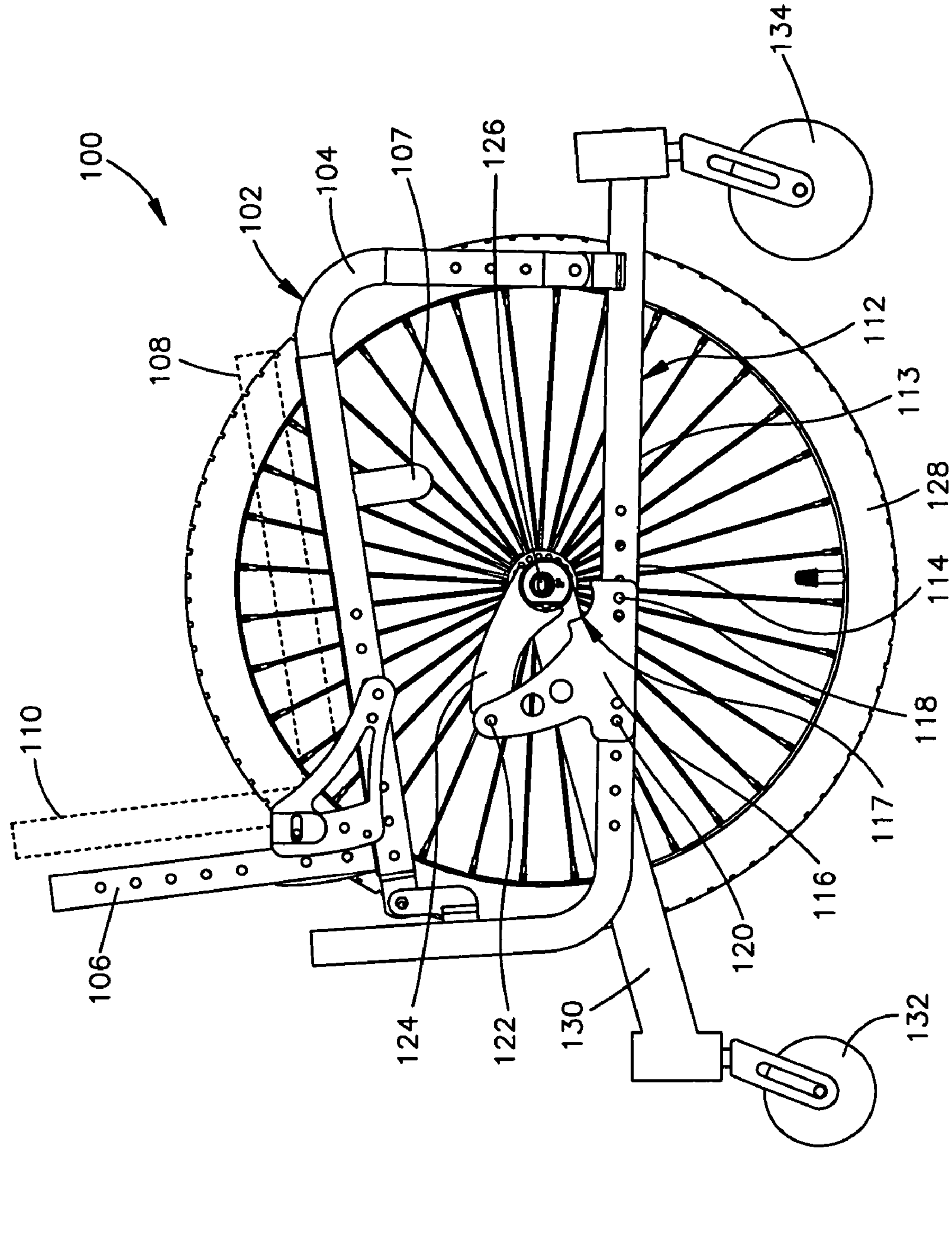
FIG. 1A is a side elevational view of a wheelchair that is a first embodiment of the invention.
Figure 1B:
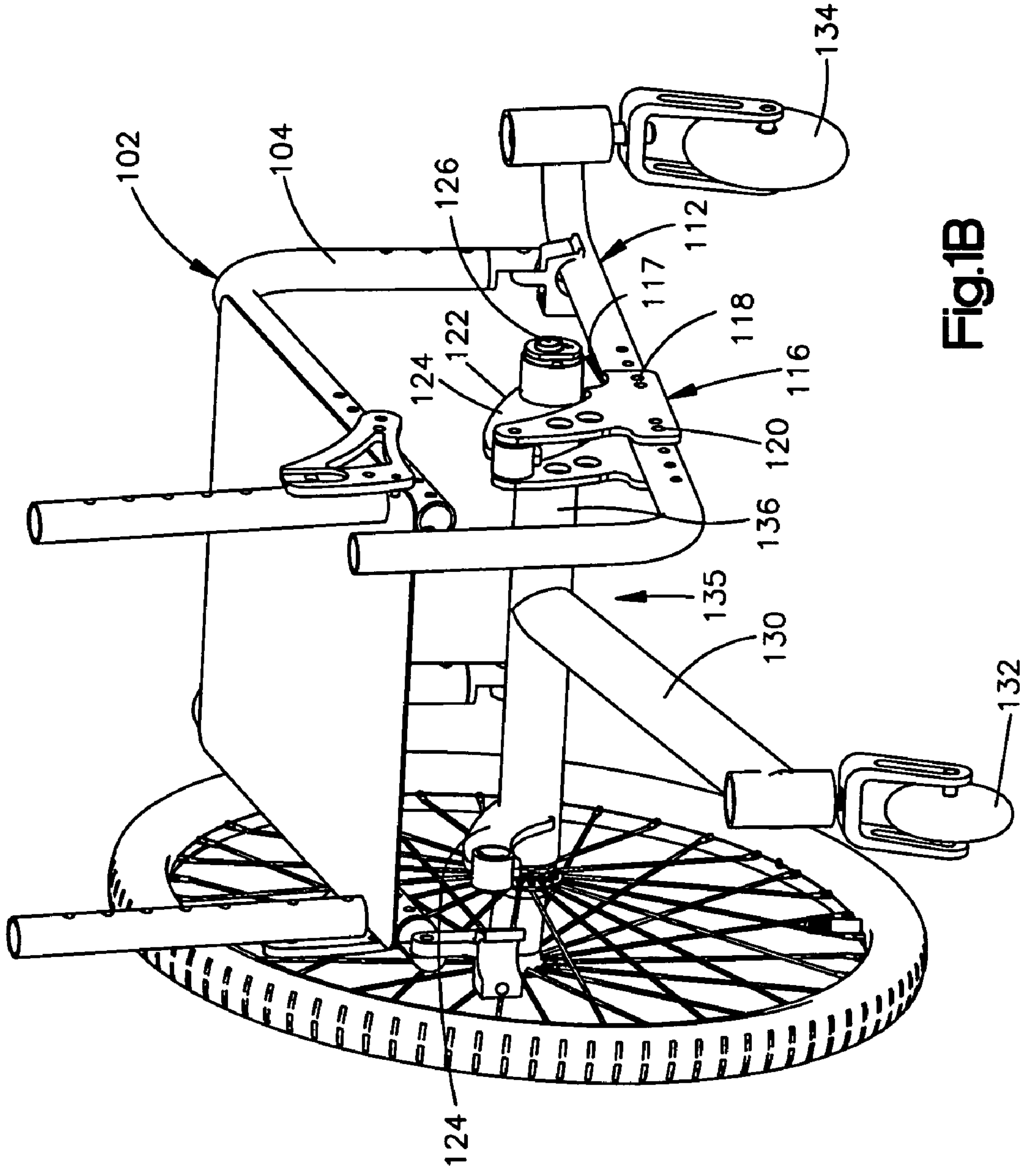
FIG. 1B is a partial perspective view of the wheelchair of FIG. 1A.
Figure 1C:
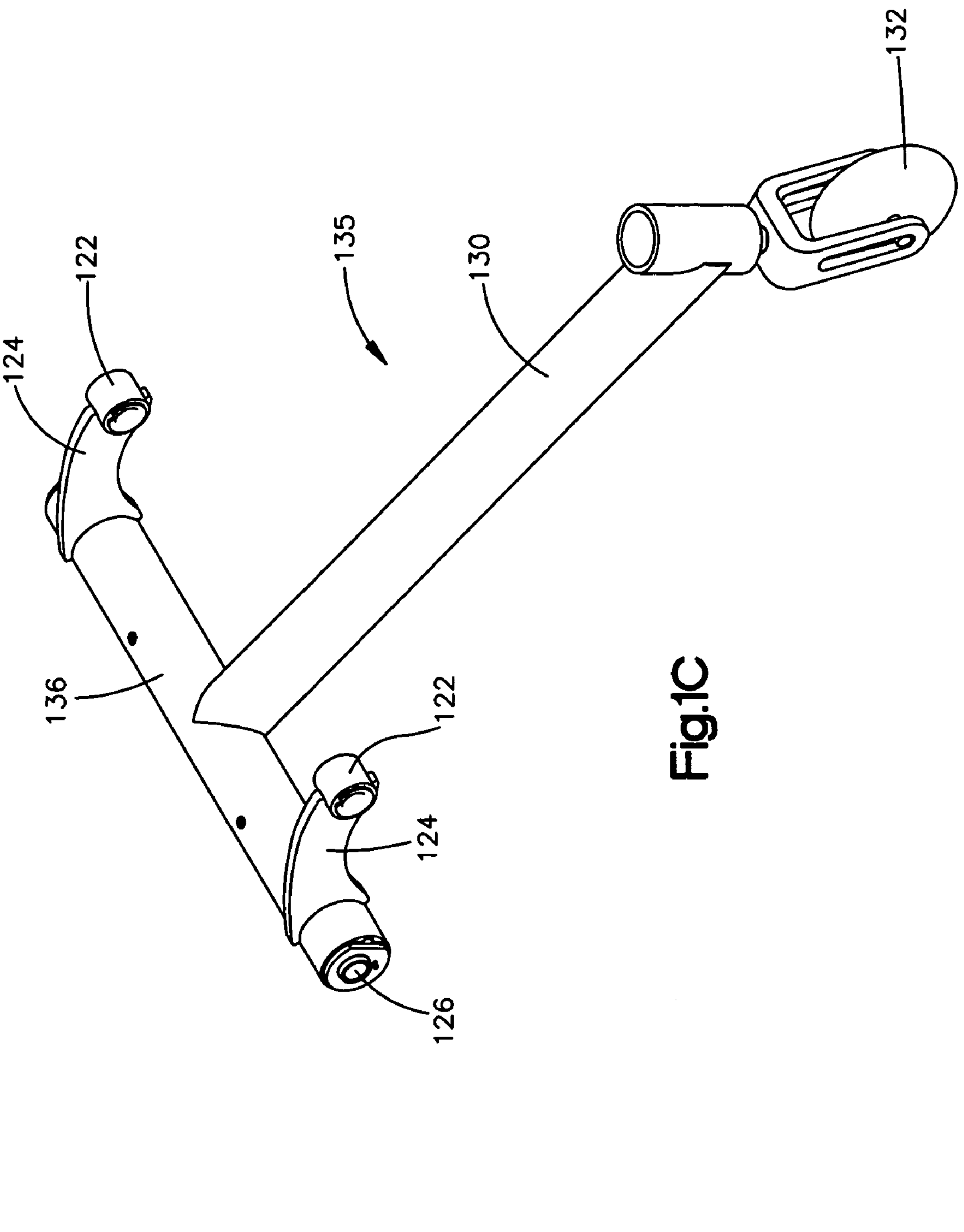
FIG. 1C is a partial perspective view of an axle tube and rear caster assembly mounting of FIGS. 1A and 1B.

Referring now to FIGS. 1A, 1B, and 1C, one embodiment of a wheelchair 100 is shown. Wheelchair 100 includes a seat frame 102 having an L-shaped section 104 and a backrest section 106. A crossbar 107 joins a second similarly configured portion of the side frame 102. A seat cushion 108 is configured to rest on seat frame 102 so as to provide support to a user. Backrest 106 may be an adjustable backrest that can tilt with respect to L-shaped section 104 of the seat frame to thereby vary the angle between the two components. A backrest cushion 110 may also be provided on backrest 106.

Wheelchair 100 also includes side frame 112. Side frame 112 has a substantially L-shaped configuration that includes a substantially horizontal section 113 and bracket 116. Near the forward portion of side frame 112 is a front caster assembly 134 that includes a caster head tube, axle and wheel.

Bracket 116 depends upwardly from side frame section 113 to form a raised pivot connection and includes a stop 117 that may be engaged by axle tube 136, as will be discussed below. Bracket 116 is connected to side frame section 113 via a plurality of apertures 114 such as, for example, apertures 118 and 120. These apertures accept removable fasteners that allow bracket 116 to be connected along the length of side frame 112 at a plurality of positions for center-of-gravity adjustments with respect to the wheelchair and/or wheelchair occupant. If such adjustments are not desired, bracket 116 can be more permanently connected or integrated into side frame 112.

An arm, or support arm, 124 is connected to bracket 116 via a joint 122. Joint 122 is a pivot joint and allows side frame 112 to pivot with respect to arm 124. Joint 122 can include a suspension to resist or dampen pivoting motion. Examples of such suspension include, but are not limited to, resilient members such as "rosta"-type elastomeric bearings or spring/shock absorbers placed between bracket 116 and arm 124.

A first portion of arm 124 is connected to bracket 116 at pivot joint 122 and a second portion of arm 124 is connected to a cross-brace member or axle tube 136, which forms a part of cross-brace assembly 135. Axle tube 136 includes axle tube fittings 126 for attaching a drive wheel 128 to the wheelchair 100. In the embodiment shown, axle tube 136 is mounted above a portion of bracket 116 that includes stop 117. The space between axle tube 136 and stop 117 provides side frame 112 with a range of tilt angle when raising front caster assembly 134. This range of tilt or pivot can assist in traversing obstacles by allowing the front caster assembly to rise from a supporting surface of the wheelchair.

This pivoting motion allows side frame 112 to raise front caster assembly 134 to assist in traversing obstacles. Seat frame 102 also pivots by virtue of its connection to side frame 112 (the seat frame 102 is fixed for movement with the side frame 112 in the illustrated embodiment). The side frame's motion is limited by the engagement between stop 117 and axle tube 136. Stop 117 has a curved section that at least approximately matches the shape of axle tube 136 and is located so as to allow engagement of axle tube 136. While stop 117 is shown on bracket 116, it can be a separate component mounted onto or integrated into side frame 112. Also, stop 117 need not have an engagement portion that approximates the shape of axle tube 136. The engagement portion can be any shape suitable for engaging axle tube 136 to limit the pivoting motion of side frame 112.

A caster arm 130 is connected to axle tube 136 between arms 124. Caster arm 130 has a first portion connected to a rear caster assembly 132 that includes a caster head tube, axle, and wheel. A second portion of caster arm 130 is connected to axle tube 136 thereby connecting rear caster assembly 132 to axle tube 136. In alternative embodiments, caster arm 130 may be connected to axle tube 130 so as to allow some degree of movement between axle tube 136 and rear caster assembly 132. Caster arm 130 is preferably centrally located (laterally) on the wheelchair 100.

Axle tube 136 includes a body having first and second distal portions that each include an arm 124. A third portion of the axle tube 136 that is between the first and second distal portions includes a connection to caster arm 130. A drive wheel axle insert/fitting 126 is also provided proximate the first and second distal portions for attaching the main drive wheels of the wheelchair. In this arrangement, the axle tube 136 acts as a cross-brace between the side frames of wheelchair 100. In this embodiment, the combination of axle tube 136 and caster arm 130 form a T-shaped frame member for wheelchair 100 to which side frame 112 is pivotally connected. In other embodiments, more than one caster arm 130 can be connected to axle tube 136.

In alternate embodiments, axle tube 136 may be omitted. For example, a cross-brace having arms 124 and caster arm 130 connected in the same position as that shown on axle tube 136 can be utilized. In such an arrangement, drive wheel axle fittings or sleeves are also connected to the cross-brace such as, for example, by a bracket depending away from the cross-brace.

In operation, the weight of the wheelchair and occupant is distributed between the front and rear caster assemblies and the main drive wheels. When side frame 112 is subject to a downward force or load behind pivot joint 122 or an upward force or load forward of pivot joint 122, side frame 112 will pivot so as to raise front caster assembly 134 from its supporting surface. This weight supported by the front caster assembly 134 is transferred to the main drive wheels and the rear caster assembly. The amount of weight transferred to the main drive wheels, as compared to the amount of weight transferred to the rear caster assembly, depends on the ratio between (a) the distance from the rear caster assembly 132 to the pivot joint 122 and (b) the distance from the main drive wheel axle connection 126 to the pivot joint 122. Hence, adjustment of the location of pivot joint 122 between the rear caster assembly 132 and the main drive wheel axle connection 126 varies the weight distribution and transfer. Raising the smaller wheels of front caster assembly 134 in effect moves them out of the way so that the larger drive wheels of the wheelchair can be more easily used to overcome large obstacles.

Figure 2A:
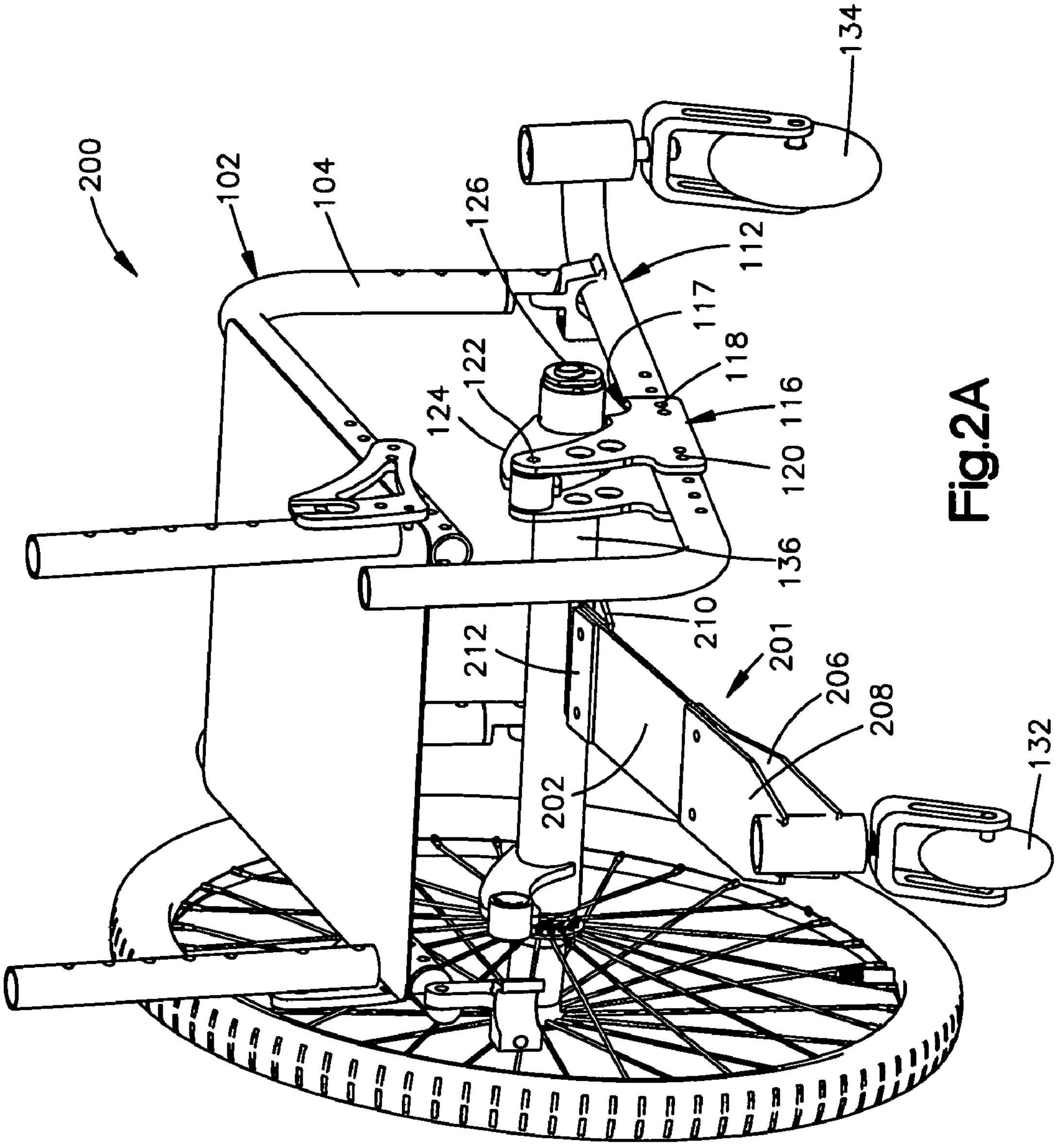
FIG. 2A is a partial perspective view a wheelchair that is a second embodiment of the invention.
Figure 2B:
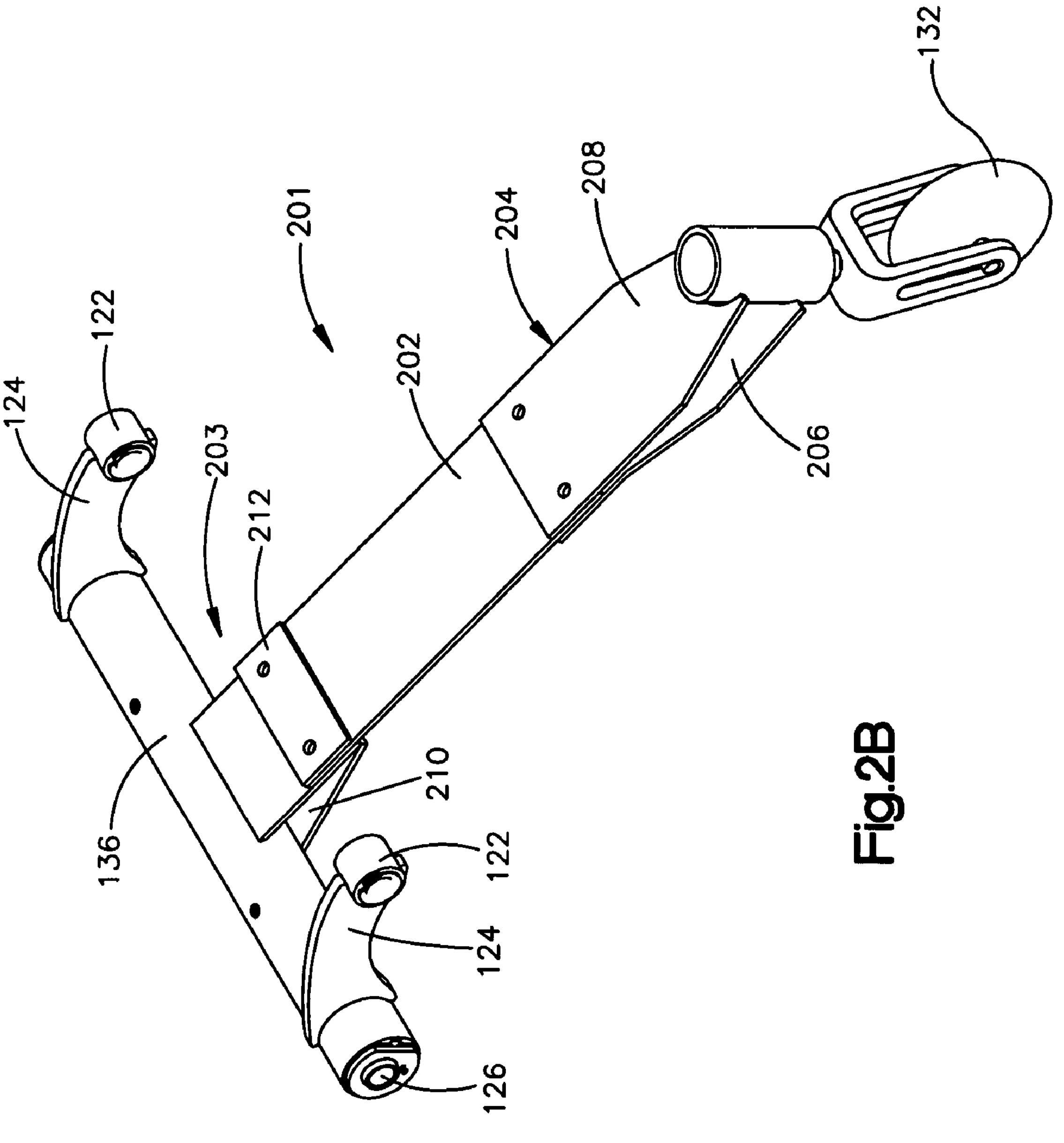
FIG. 2B is a partial perspective view of an axle tube and rear caster assembly mounting of FIG. 2A.

FIGS. 2A and 2B illustrate a second embodiment in the form of a wheelchair 200. Wheelchair 200 is substantially similar to wheelchair 100, except that it includes a different embodiment of a caster arm in the form of caster arm 201. Caster arm 201 includes, for example, an axle tube mount 203 having first and second flanges 210 and 212, a resilient member 202, and a caster mount 204 having first and second caster mount flanges 206 and 208. In one embodiment, resilient member 202 is a leaf spring that can bend when loaded by a force or weight and return to its unloaded position when the force or weight is removed. In other embodiments, resilient member 202 can be a spring or combination spring/shock absorber.

On one end, resilient member 202 is connected to axle tube 136 via attachment to flanges 210 and 212. On a second end, resilient member 202 is connected to rear caster assembly 132 via attachment to flanges 206 and 208. The attachment can be a removable attachment such as, for example, by removable fasteners that are received in apertures of the flanges. This arrangement allows for the attachment and removal of resilient members 202 that are of different resiliency and characteristic. In alternative embodiments, resilient member 202 can be directed connected to axle tube 132 and rear caster assembly 132 via welding or brazing. In this regard, resilient member 202 provides a degree of suspension between axle tube 136 and rear caster assembly 132 that allows rear caster assembly 132 to move with respect to its position versus axle tube 132.

Figure 3A:
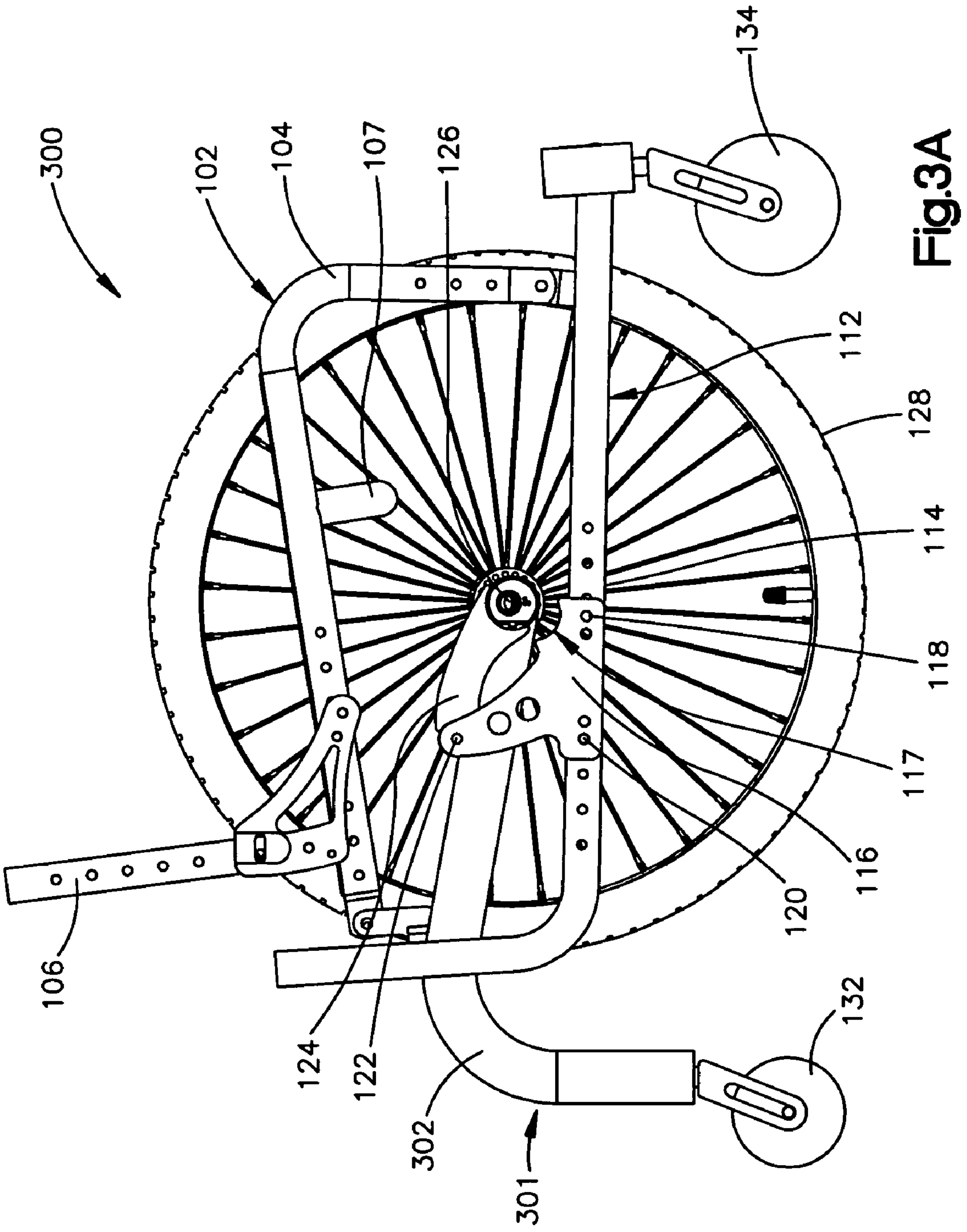
FIG. 3A is a side elevational view of a wheelchair that is a third embodiment of the invention.
Figure 3B:
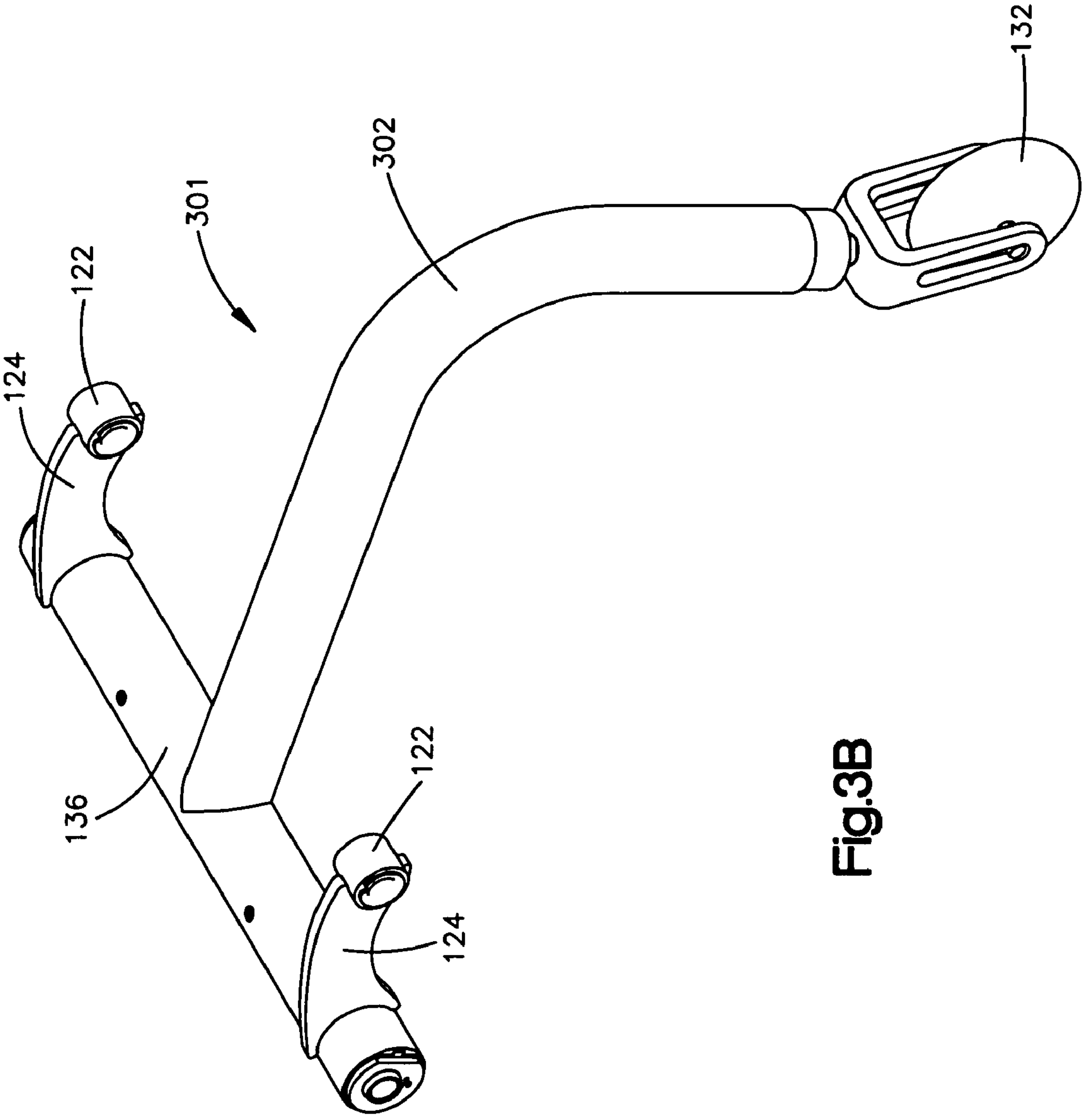
FIG. 3B is a partial perspective view of an axle tube and rear caster assembly mounting of FIG. 3A.

FIGS. 3A and 3B illustrate a third embodiment in the form of a wheelchair 300. Wheelchair 300 is substantially similar to wheelchair 100, except that it includes a different embodiment of a caster arm in the form of caster arm 301. Caster arm 301 is substantially similar to caster arm 130, except that it includes a non-linear geometry. For example, caster arm 301 includes a curved section 302.

FIGS. 4A-4H illustrate a fourth embodiment in the form of a wheelchair 400. The wheelchair 400 includes a releasable link 402 between the seat frame 404 and the side frame of the wheelchair. The presence of the releasable link 402 enables folding (collapsing) of the wheelchair 400 to a compact shape, as shown schematically in the series of view 4A-4H.

Figure 4B:
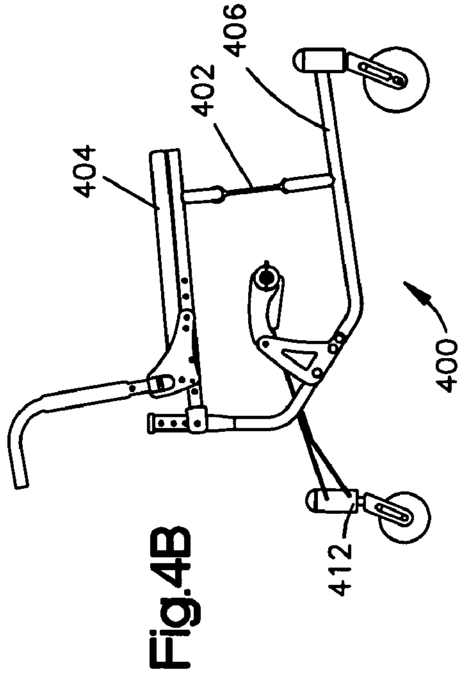
FIGS. 4A-4H are a series of views illustrating folding of a wheelchair of the present invention.
Figure 4D:
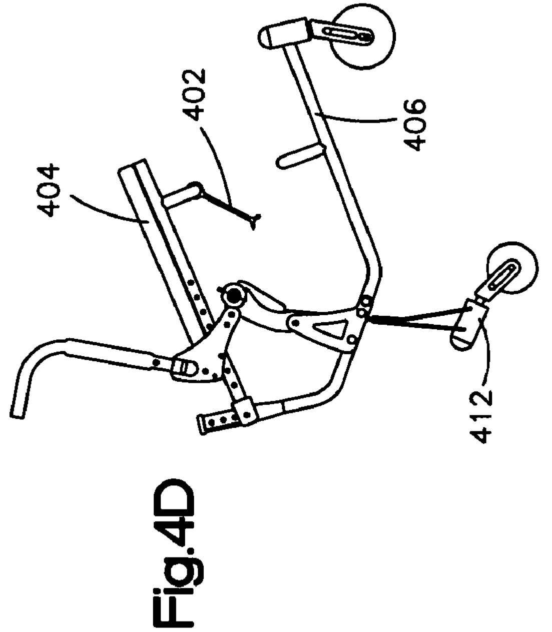
Figure 4A:
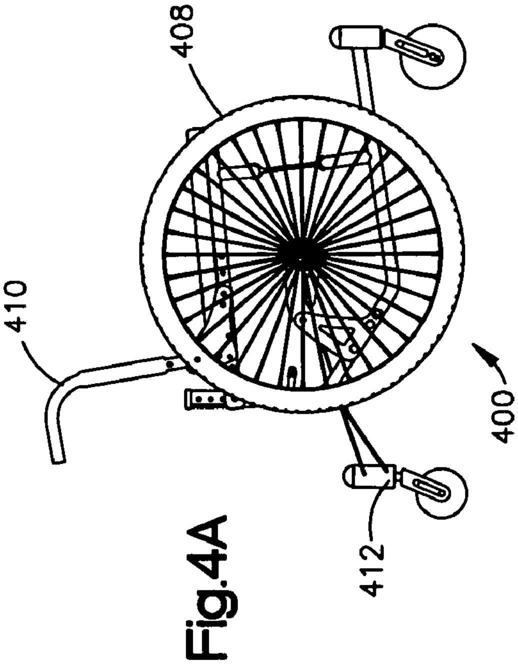

In FIG. 4A, the wheelchair 400 is shown fully assembled. In FIG. 4B, the main wheels 408 are removed from the wheelchair 400 but the seat frame 404 and the side frame 406 are not altered.

Figure 4C:
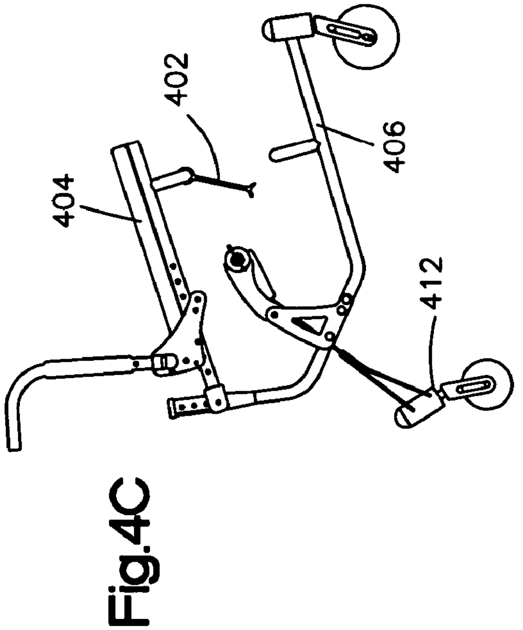
Figure 4E:
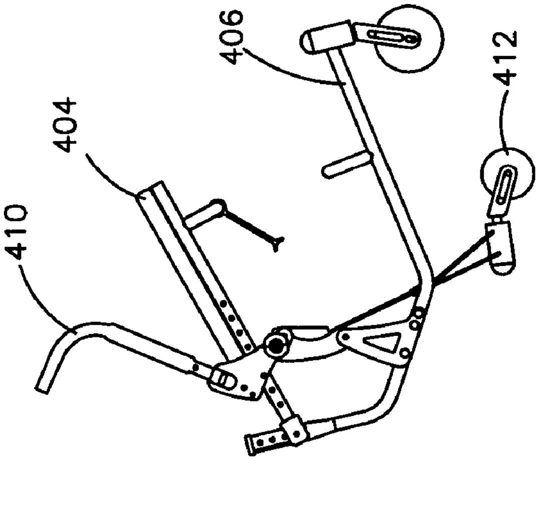
Figure 4F:
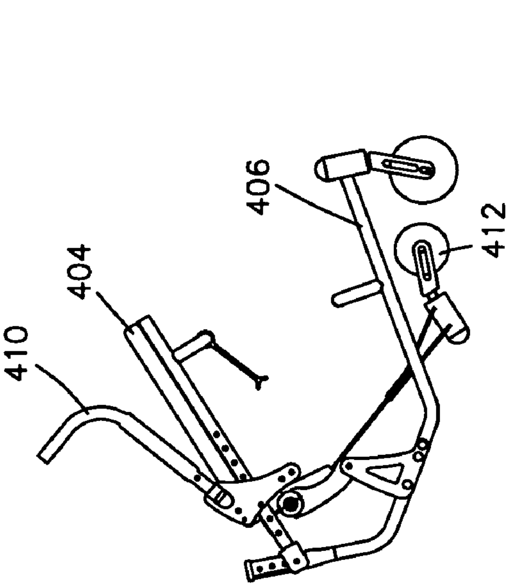

In FIG. 4C, the link 402 is opened or released, allowing the seat frame 404 to be pivoted upward relative to the side frame 406. In FIGS. 4D-4F, the backrest 410 and the caster arm 412 are pivoted to be more parallel with the seat frame 404 and the side frame 406. The caster arm 412 is swung up and forward, in between the two sides of the side frame 406, which action is made easier because the caster arm is a single centrally located arm.

Figure 4G:
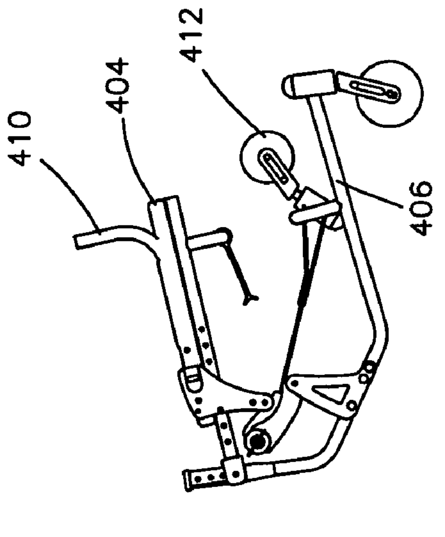
Figure 4H:
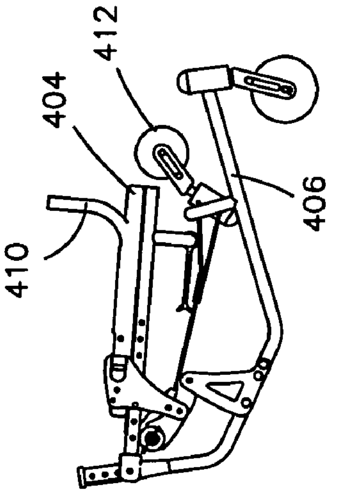

Finally, in FIGS. 4G and 4H, the seat frame 404 and the side frame 406 are pivoted closer to each other, resulting in the wheelchair 400 having a compact folded shape.

FIGS. 5A-5D illustrate the simulated operation of the wheelchair 400 in backing up (being pulled up) a set of steps. This operation is enabled as the rear caster arm 412 is pivotable upward relative to the seat frame 404 to a degree sufficient to enable pulling the wheelchair 400 backward up a set of steps. This action is made easier because the caster arm 412 is a single centrally located arm.

Figure 5B:
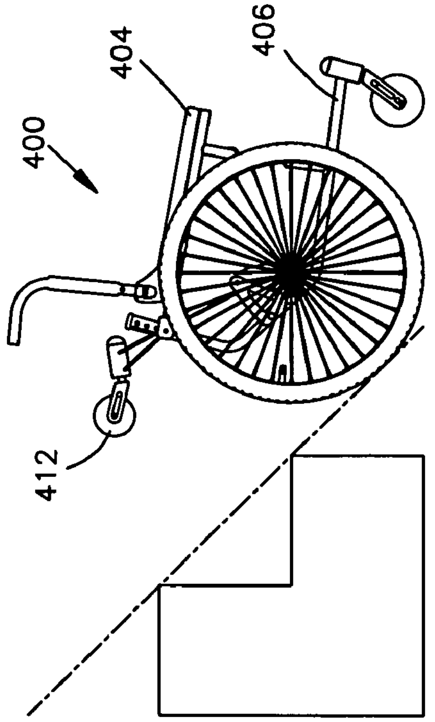
FIGS. 5A-5D are a series of views illustrating backing up steps with a wheelchair of the present invention.
Figure 5D:
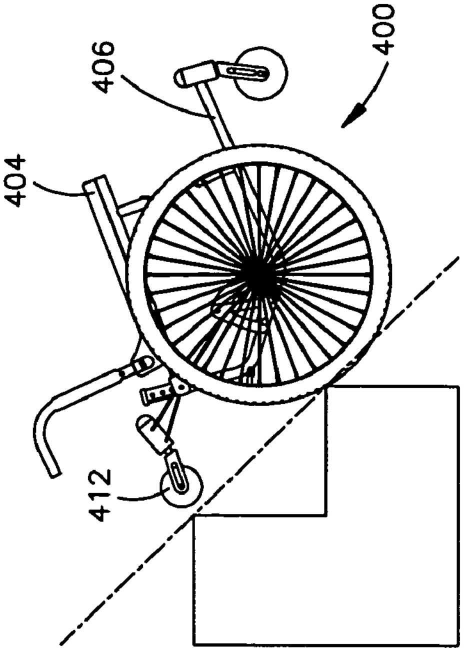
Figure 5A:
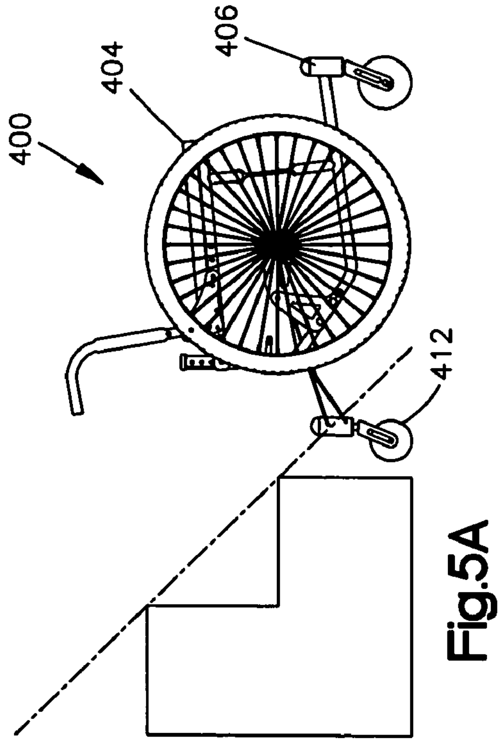

In FIG. 5A, the wheelchair 400 is level and adjacent to the set of steps. In FIG. 5B, the caster arm 412 is raised up, relative to the side frame 406 and the seat frame 404, to enable sufficient clearance for the drive wheels of the wheelchair 400 to engage the set of steps.

Figure 5C:
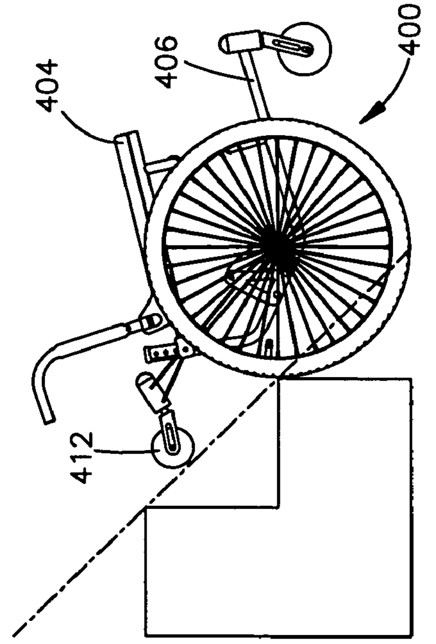

FIGS. 5C and 5D illustrate how the caster wheel on the caster arm 412 remains above the plane of the steps (as indicated by the dot-dash line) while the wheelchair 400 is being backed up (pulled up) the set of steps.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, seat frame or side frame can have different geometries from that shown herein, arm 124 can including a plurality of apertures therein to allow pivot joint 122 to be moved or adjusted along arm 124, and clamps can be used to facilitate connections between components. Also, the present invention provides a wheelchair having the feel and benefits of a rigid chair, while still being collapsible but not using the collapsible cross-frames typically used. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

What is claimed is:

1. A wheelchair comprising:
a first assembly that includes;
a seat frame;
a stop connected to the seat frame;
a front caster assembly fixed for movement with the seat frame;
a second assembly that includes;
an axle tube;
a pair of drive wheels connected at opposite ends of the axle tube;
a rear caster arm fixed to the center of the axle tube such that the axle tube and the rear caster arm form a "T " shape;
a rear caster connected to the rear caster arm;
a pivot arm fixed to the axle tube and extends rearward from the axle tube;
a pivot joint that connects the pivot arm to the first assembly;
wherein the first assembly pivots with respect to the second assembly to raise the front caster from a supporting surface of the wheelchair; and
wherein the pivoting of the first assembly with respect to the second assembly is limited by engagement of the first assembly with the stop.

2. A wheelchair as set forth in claim 1 wherein the rear caster a single caster that is centrally located laterally on the wheelchair.

3. A wheelchair as set forth in claim 1 wherein the pivot joint comprises an arm that is fixed for movement with the axle tube and extends rearward from of the axle tube.

4. A wheelchair as set forth in 1 wherein the first assembly comprises a side frame that connects the seat frame to the front caster assembly, wherein the side frame includes at least one releasable link, the link when released allowing collapsing of the wheelchair after removal of main wheels of the wheelchair.

5. A wheelchair as set forth in claim 1 wherein the rear caster arm is pivotable upward relative to the at first assembly to a degree sufficient to enable pulling the wheelchair backward up a set of steps.

6. A wheelchair as set forth in claim 1 wherein the rear caster assembly includes a single tubular arm.

7. A wheelchair as set forth in claim 1 wherein the rear caster assembly includes a resilient member.

8. A wheelchair as set forth in claim 1 wherein the rear caster assembly has a non-linear geometry.

9. A wheelchair set forth in claim 1 wherein the stop comprises a bracket connected to seat frame.

10. A wheelchair comprising:
a first assembly that includes;
a left side seat frame;
a left front caster assembly fixed for movement with the left side seat frame;
a right side seat frame;
a right front caster assembly fixed for movement with the right side seat frame;
a seat fixed for movement with the left and right side seat frames and left and right front caster assemblies;
one or more stops connected to the side seat frames;
a second assembly that comprises:
an axle tube that includes left and right main wheel fittings;
left and right main wheels connected to the left and right main wheel fittings of the axle tube;
a left arm connected to and fixed for movement with the axle tube, the left arm extending rearward from the axle tube, the left arm being pivotally connected to the left side seat frame through a left pivot joint;
a right arm connected to and fixed for movement with the axle tube, the right arm extending rearward from the axle tube, the right arm being pivotally connected to the right side seat frame through a right pivot joint;
a rear caster arm fixed to the center of the axle tube such that the axle tube and the rear caster arm form a "T " shape;
a rear caster connected to the rear caster arm;
wherein the first assembly pivots with respect to the second assembly to raise the left and right front caster assemblies from a supporting surface of the wheelchair; and
wherein the pivoting of the first assembly with respect to the second assembly is limited by engagement of the first assembly with the one or more stops.

11. A wheelchair set forth in claim 10 wherein to stop comprises a bracket connected to the seat frame.

12. A wheelchair as set forth in claim 10 wherein the rear caster arm is a single arm that is centrally located laterally on the wheelchair.

13. A wheelchair as set forth in claim 10 wherein the left and right pivot joints are located rearward of the axle tube.

14. A wheelchair as set forth in claim 13 wherein the rear caster arm is a single arm that is centrally located laterally on the wheelchair.

15. A wheelchair as set forth in claim 10 including a left releasable link in the left side frame and a right releasable link in the right side frame, the links when released allowing collapsing of the wheelchair after removal of the left and right main wheels of the wheelchair.

16. A wheelchair as set forth in claim 10 wherein the rear caster arm is pivotable upward relative to the left and right side frames to a degree sufficient to enable pulling the wheelchair backward up a set of steps.

17. A wheelchair as set forth in claim 10 wherein the rear caster assembly includes a single tubular arm.

18. A wheelchair as set forth in claim 10 wherein the rear caster assembly includes a resilient member.

* * * * *

UNITED STATES PATENT AND TRADEMARK OFFICE

CERTIFICATE OF CORRECTION

PATENT NO. : 7,419,182 B2 Page 1 of 1
APPLICATION NO. : 11/334295
DATED : September 2, 2008
INVENTOR(S) : Goertzen et al.

It is certified that error appears in the above-identified patent and that said Letters Patent is hereby corrected as shown below:

Column 6, Line 6, “of” should be deleted.

Column 6, Line 14, “at” should be deleted.

Column 6, Line 23, “as” should be inserted after “wheelchair”.

Column 6, Line 24, “the” should be inserted after “to”.

Column 6, Line 61, “to” should be replaced with --the--.

Signed and Sealed this

Twenty-eighth Day of October, 2008

Jon W. Dudas

JON W. DUDAS
*Director of the United States Patent and Trademark Office*